United States Patent
Schmehl (10) Patent No.: US 10,836,090 B2
(45) Date of Patent: *Nov. 17, 2020

(54) THREE-DIMENSIONAL FABRICATION WITH CAVITY FILLING

(71) Applicant: MakerBot Industries, LLC, Brooklyn, NY (US)

(72) Inventor: Peter Joseph Schmehl, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 15/866,990

(22) Filed: Jan. 10, 2018

(65) Prior Publication Data

US 2018/0126635 A1 May 10, 2018

Related U.S. Application Data

(63) Continuation of application No. 15/332,653, filed on Oct. 24, 2016, now Pat. No. 9,884,450, which is a
(Continued)

(51) Int. Cl.
*B29C 48/154* (2019.01)
*B29C 64/118* (2017.01)
(Continued)

(52) U.S. Cl.
CPC ............ *B29C 48/154* (2019.02); *B29C 48/92* (2019.02); *B29C 64/106* (2017.08);
(Continued)

(58) Field of Classification Search
CPC ..... B29C 64/205; B29C 48/92; B29C 48/154; B29C 64/209; B29C 64/106;
(Continued)

(56) References Cited

U.S. PATENT DOCUMENTS

| 5,641,448 A | 6/1997 | Yeung et al. |
| 7,917,243 B2 | 3/2011 | Batchelder et al. |

(Continued)

OTHER PUBLICATIONS

USPTO, "U.S. Appl. No. 15/332,653 Notice of Allowance dated Oct. 2, 2017", 10 pages.
(Continued)

*Primary Examiner* — Robert E Fennema
*Assistant Examiner* — Jigneshkumar C Patel
(74) *Attorney, Agent, or Firm* — Strategic Patents, P.C.

(57) ABSTRACT

A three-dimensional printer is configured to fill interior cavities of a fabricated object with functional or aesthetic materials during fabrication. In general, a number of layers can be fabricated with an infill pattern that leaves void space within an exterior surface of the object. These void spaces can receive a second material such as an epoxy or adhesive that spans multiple layers of the object to increase structural integrity. Similarly, aesthetic materials may be used to add color, opacity, or other desired properties to a fabricated object. The void spaces can also or instead form molds that are filled with a build material to provide a fabricated object.

23 Claims, 5 Drawing Sheets

Related U.S. Application Data continuation of application No. 14/065,449, filed on Oct. 29, 2013, now Pat. No. 9,475,233.

(60) Provisional application No. 61/719,874, filed on Oct. 29, 2012.

(51) Int. Cl.

| | | |
|---|---|---|
| *B29C 48/92* | (2019.01) | |
| *B29C 64/209* | (2017.01) | |
| *B29C 64/205* | (2017.01) | |
| *B29C 64/40* | (2017.01) | |
| *B33Y 30/00* | (2015.01) | |
| *B33Y 50/02* | (2015.01) | |
| *B29C 48/02* | (2019.01) | |
| *B29C 48/265* | (2019.01) | |
| *B29C 48/25* | (2019.01) | |
| *B33Y 80/00* | (2015.01) | |
| *B33Y 10/00* | (2015.01) | |
| *B33Y 40/00* | (2020.01) | |
| *B33Y 70/00* | (2020.01) | |
| *B33Y 50/00* | (2015.01) | |
| *B29C 64/393* | (2017.01) | |
| *B29C 64/386* | (2017.01) | |
| *B29C 64/106* | (2017.01) | |
| *B29K 101/12* | (2006.01) | |
| *B29K 105/00* | (2006.01) | |

(52) U.S. Cl.
CPC .......... *B29C 64/118* (2017.08); *B29C 64/205* (2017.08); *B29C 64/209* (2017.08); *B29C 64/386* (2017.08); *B29C 64/40* (2017.08); *B33Y 30/00* (2014.12); *B33Y 50/02* (2014.12); *B29C 48/02* (2019.02); *B29C 48/265* (2019.02); *B29C 48/266* (2019.02); *B29C 2948/9258* (2019.02); *B29C 2948/92704* (2019.02); *B29K 2101/12* (2013.01); *B29K 2105/0067* (2013.01); *B33Y 10/00* (2014.12); *B33Y 40/00* (2014.12); *B33Y 50/00* (2014.12); *B33Y 70/00* (2014.12); *B33Y 80/00* (2014.12)

(58) Field of Classification Search
CPC ....... B29C 64/386; B29C 64/40; B29C 48/02; B29C 48/265; B29C 48/266; B29C 2948/9258; B29C 2948/92704; B29C 64/118; B29C 64/393; B33Y 30/00; B33Y 50/02; B33Y 80/00; B33Y 10/00; B33Y 40/00; B33Y 70/00; B33Y 50/00; B29K 2105/0067; B29K 2101/12
USPC ........................................................ 700/118
See application file for complete search history.

(56) References Cited

U.S. PATENT DOCUMENTS

| | | | |
|---|---|---|---|
| 2003/0234179 A1* | 12/2003 | Bang | B81C 99/0085 205/70 |
| 2004/0065553 A1* | 4/2004 | Cohen | B81C 1/00126 205/118 |
| 2005/0241690 A1* | 11/2005 | Tajima | H01L 35/08 136/212 |
| 2006/0066006 A1* | 3/2006 | Haraldsson | B82Y 10/00 264/255 |
| 2006/0099405 A1* | 5/2006 | Guiselin | B32B 3/04 428/323 |
| 2006/0239481 A1 | 10/2006 | Martin | |
| 2012/0232857 A1 | 9/2012 | Fisker et al. | |
| 2014/0121813 A1 | 5/2014 | Schmehl | |

OTHER PUBLICATIONS

USPTO, "U.S. Appl. No. 14/065,449 Notice of Allowance dated Jun. 20, 2016", NPL-250, 13 pages.

* cited by examiner

THREE-DIMENSIONAL FABRICATION WITH CAVITY FILLING

RELATED APPLICATIONS

This application is a continuation of U.S. application Ser. No. 15/332,653 filed on Oct. 24, 2016, which is a continuation of U.S. application Ser. No. 14/065,449 filed on Oct. 29, 2013 (now U.S. Pat. No. 9,475,233), which claims the benefit of U.S. App. No. 61/719,874 filed on Oct. 29, 2012, where the entire content of each is hereby incorporated by reference.

BACKGROUND

There remains a need three-dimensional printing systems capable of filling interior voids of a fabricated object with aesthetic or functional material(s).

SUMMARY

A three-dimensional printer is configured to fill interior cavities of a fabricated object with functional or aesthetic materials during fabrication. In general, a number of layers can be fabricated with an infill pattern that leaves void space within an exterior surface of the object. These void spaces can receive a second material such as an epoxy or adhesive that spans multiple layers of the object to increase structural integrity. Similarly, aesthetic materials may be used to add color, opacity or other desired properties to a fabricated object. The void spaces can also or instead form molds that are filled with a build material to provide a fabricated object.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a series of two dimensional paths to form a three-dimensional object from a digital model, it will be understood that numerous additive fabrication techniques are known in the art including without limitation multijet printing, stereolithography, Digital Light Processor ("DLP") three-dimensional printing, selective laser sintering, and so forth. Any such techniques that may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
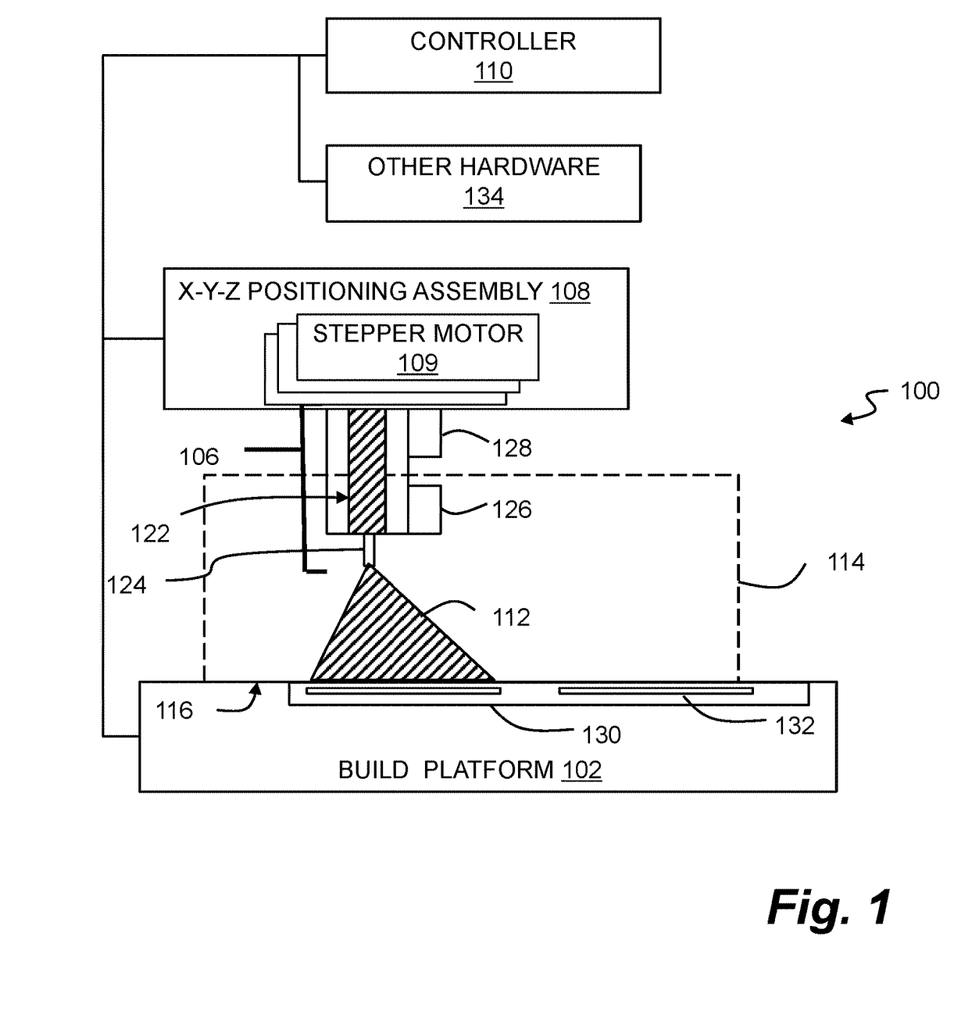
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

In general, the above system can build a three-dimensional object by depositing lines of build material in successive layers—two-dimensional patterns derived from the cross-sections of the three-dimensional object. As described below, three-dimensional printing may be augmented to accommodate multi-material builds.

Figure 2:
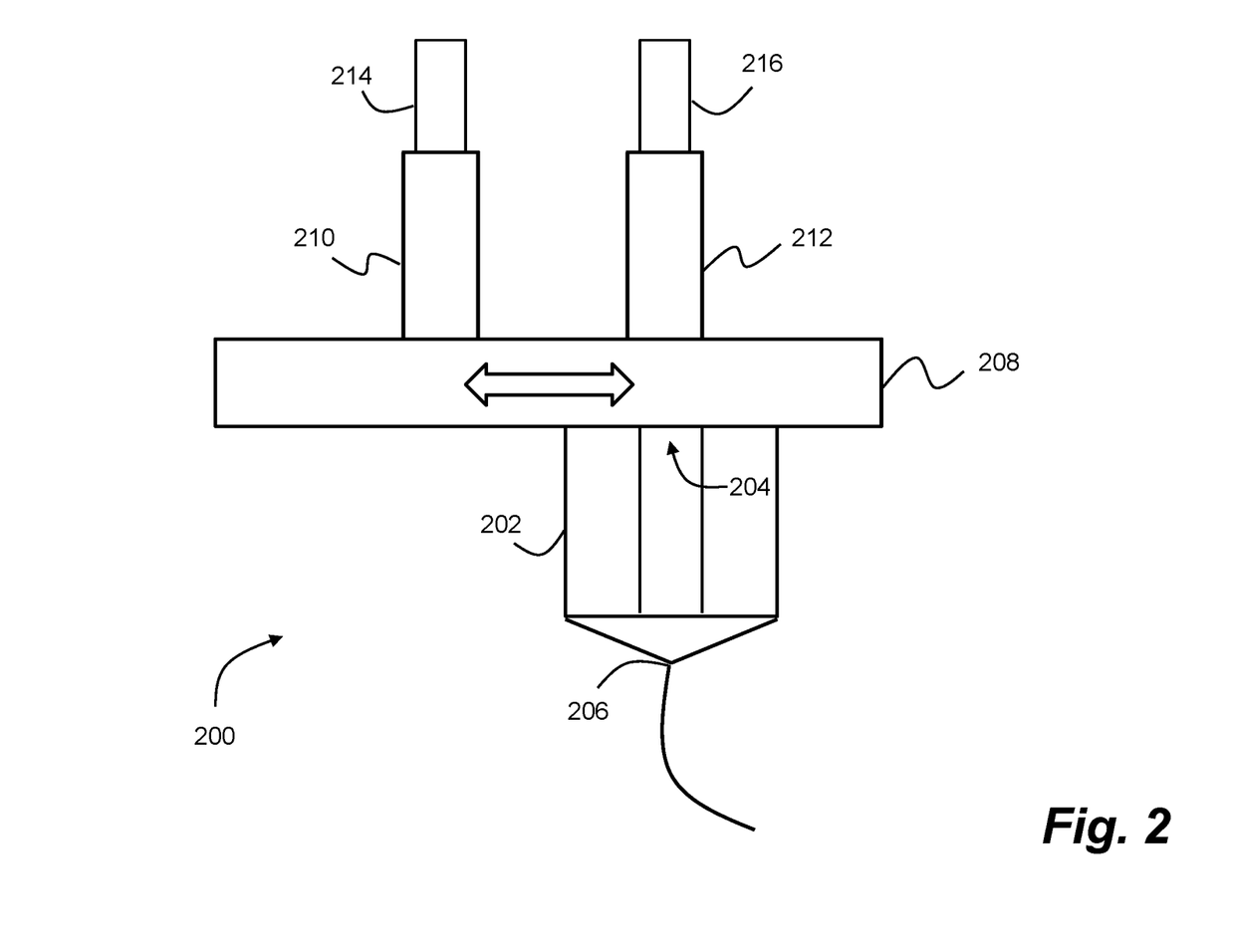
FIG. 2 depicts an extruder for multiple build materials.

FIG. 2 depicts an extruder for multiple build materials. In general, an extruder 200 of a three-dimensional printer may include an extrusion head 202 with a feed 204 and a nozzle 206, along with any suitable heating elements or the like as described above, along with a filament changer 208 and a processor such as any of the controllers described above.

The filament changer 208 may, for example include a first feed 210 and a second feed 212 that receive a first build material 214 and a second build material 216 respectively. The filament changer 208 may, for example slide horizontally over a blade or other cutting edge to cut one of the build materials 214, 216 that is being moved away from the feed 204 of the extruder 200 while moving the other one of the build materials 214, 216 into the feed 204 of the extruder 200. In one aspect, each of the feeds 210, 212 of the filament changer 208 may have an independent feed drive motor so that the new filament can be fed into a drive motor of the extruder 200 in a controlled manner as a loose end of the old filament is driven into the extruder 200. In this manner, an adequate driving force can be maintained for the extrusion process while the build material is changing. More generally, the filament changer 208 may be configured in any suitable fashion to receive a first filament (such as the first build material 214) and a second filament (such as the second build material 216) and to selectively deliver one of these filaments as a build material to the extruder 200. The filament changer 208 may be configured to switch between these supplies of material without interrupting the supply of material to the extruder 200, e.g., using the sliding structure described above; however it should be noted that the mechanical details of the filament changer 208 are not important, and any configuration capable of changing from one build material to another without an unrecoverable loss of extrusion from the extruder 200 may be suitable employed.

In a similar manner, the filament changer 208 may be configured to receive and select among any number of additional build materials (in filaments or other form) for feeding to the extruder 200, and to controllably select one of the build materials for extrusion under control of a processor or other control signal source. In other embodiments, two separate extruders may be alternately positioned along the tool path with similar affect.

A processor (not shown) may be configured to control the rate of delivery of build material from the extruder 200 and to control a selection of the first filament or the second filament by the filament changer 208. The processor may include any of the controllers described above. The processor may also control an x-y-z positioning assembly as described above along with the extruder 200 and the filament changer 208 to fabricate an object from a three-dimensional model. Where the three-dimensional model includes an exterior surface with two colors, the processor may control the filament changer 208 to change between two different build materials (e.g., of the two colors) in order to reproduce the two colors on an object fabricated from the three-dimensional model. Thus the colors from the three-dimensional model may be imparted on an exterior of the object according to the colors of the three-dimensional model, providing multi-color fabrication capabilities for the three-dimensional printer.

While color switching is one useful application of the systems and methods described herein, it will be further appreciated that the same techniques may be employed to switch between multiple build materials for a variety of other reasons. For example, different build materials may have different optical properties (opacity, color, finish, etc.), different mechanical properties (elasticity, strength, melting point, etc.), different chemical properties (curing conditions, solubility, etc.), thermal properties (insulation, etc.), electrical properties (conductance, etc.) and so forth, any of which might usefully be combined in an object fabricated from a model. The techniques described herein may be usefully employed to enable switching of build materials in any such multi-material models.

In particular, the extruder 200 may be used to switch between a first material, such as a build material, and a second material, such as a void-filling material, as generally contemplated below.

Figure 3:
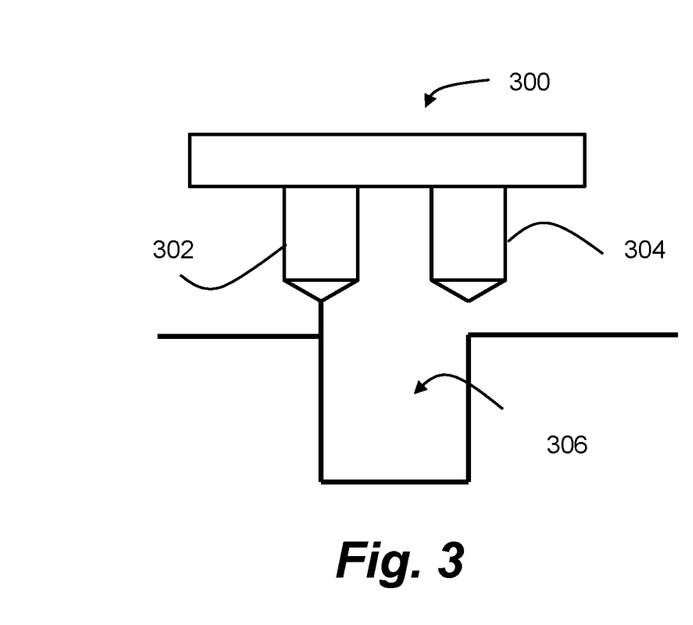
FIG. 3 shows an extrusion head with two extruders.

FIG. 3 shows an extrusion head with two extruders. In general, a first extruder 302 may be used to extrude a first material and the second extruder 304 may be used to extrude a second material. The first material may be any material suitable for fabricating a three-dimensional object, such as any of the build materials described above. The second material may, for example, be any material useful for void filling, such as a foam, a resin, an adhesive, an epoxy, a glue, and so forth.

As depicted, the first extruder 302 and the second extruder 304 may be joined together in a shared extrusion head 300. This configuration advantageously permits shared control with a common x-y-z positioning assembly such as any of the positioning assemblies described above. However it will be understood that a three-dimensional printer may also or instead use extruders with separate positioning assemblies without departing from the scope of this disclosure.

In another aspect, the second material may be a build material similar or identical to the first material. Thus, in certain aspects, a void may be filled with an extrudate of build material rather than a specialized adhesive or structural filler. Additionally, although the following description refers generally to a first extruder with a first material and a second extruder with a second material, it should be clear that the first extruder and the second extruder may be the same extruder, and/or that the first material and the second material may be the same material (or the same type of material). For example, the first material and the second material may be a single type of build material, and may in certain embodiments be extruded alternately from a single extruder. While the first tool 302 may optionally be used to distribute such fillers, a different tool such as the second tool 304 may advantageously be optimized for high volume dispensation (e.g., with a larger extrusion orifice) or otherwise adapted for use with various fill materials having different properties than typical build materials.

In general, the extrusion head 300 may be controlled by a controller such as any of the controllers described above, and may be positioned by an x-y-z positioning assembly under control of the controller to fabricate a three-dimensional object within a build volume of a three-dimensional printer.

Figure 4:
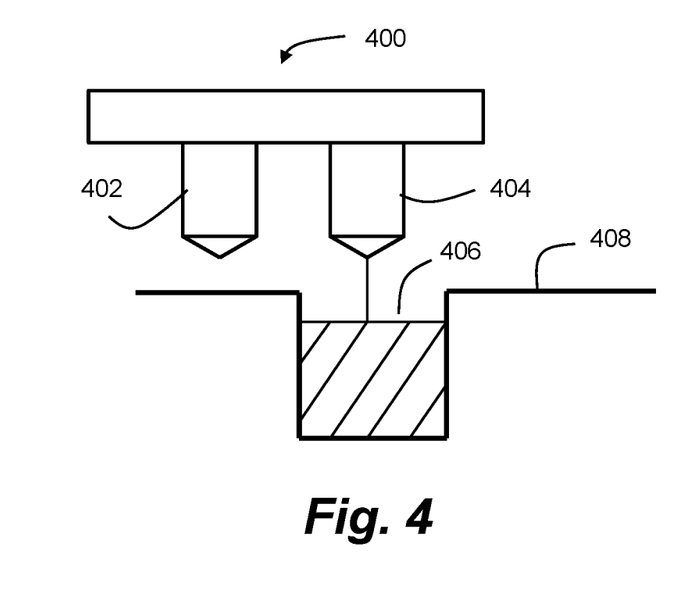
FIG. 4 illustrates a void-filling process.

FIG. 4 illustrates a void-filling process. An extrusion head 400 such as any of the extrusion heads described above may be switched from a first extruder 402 for build material to a second extruder 404 for fill material. The fill material 406 may be used to fill a void in an object 408 to any desired level of fullness. The fill material may, as noted above, be any foam, resin, adhesive, epoxy, glue, or the like. The fill material may also be a liquid, which may be left in liquid form, e.g., for an aesthetic effect, of the fill material may be a liquid that is curable into a solid form using, e.g., heat, light, time, curing agents, or the like. In another aspect, the fill material may include silicone or any other gel or the like, which may also or instead be deposited around an object during fabrication as a support material.

Figure 5:
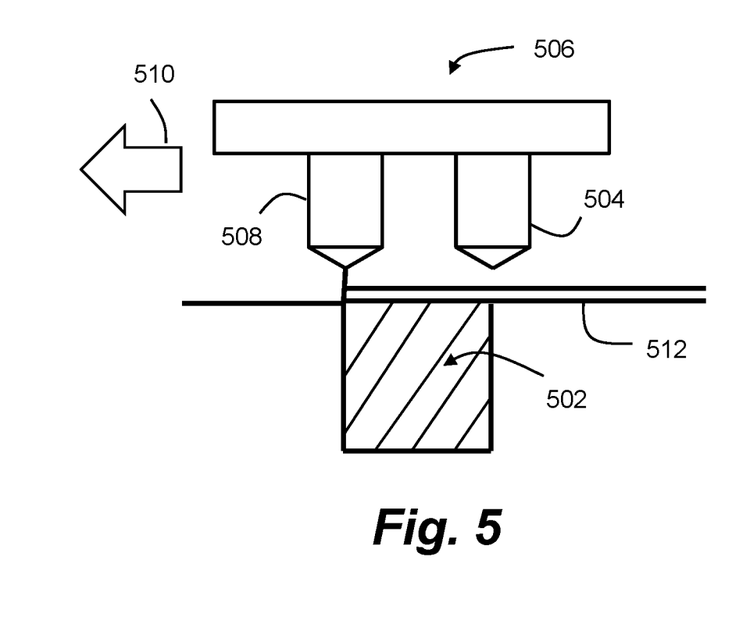
FIG. 5 shows a void-closing process.

FIG. 5 shows a void-closing process. After a void 502 in an object has been filled with a fill material from a second extruder 504 of a dual extrusion tool head 506, a first extruder 508 may extrude in a path as generally indicated by an arrow 510 to enclose the void 502 with a layer 512 of build material. In this manner, the fill material may be enclosed within the void 502 to fill the corresponding void space within the object. This general technique may be adapted in a variety of ways as more generally discussed herein to achieve desired aesthetic and structural/functional results.

Figure 6:
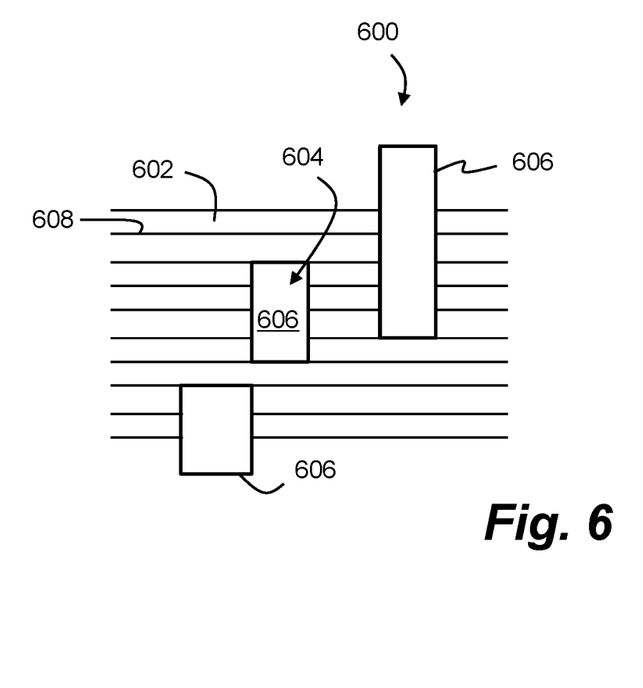
FIG. 6 shows a layered object with filled voids.

FIG. 6 shows a layered object with filled voids. In general an object 600 may be fabricated from a number of layers 602 with a number of cavities 604 that are filled with a fill material 606. The cavities 604 may be created in any suitable shape, such as cylinders parallel with the z-axis, rectangles or other prismatic shapes, or any other shape or combination of shapes suitable for interstitial fabrication within an object to fill cavities 604. The fill material 606 may be a structural filler and/or adhesive used to improve strength across lamination boundaries 608, i.e., between adjacent layers 602 of a layered fabrication. As shown in FIG. 6, these cavities 604 and fill materials 606 may be staggered, overlapped, or otherwise positioned at predetermined locations relative to layer boundaries, object boundaries, and one another to achieve improved strength in a fabricated object. In particular, this type of arrangement addresses a characteristic z-axis weakness of certain layered fabrication techniques by providing solid support across layer boundaries. This can advantageously mitigate delamination or similar z-axis structural disruptions in fabricated objects.

Although shown as vertical cavities, in one aspect, the edges of adjacent ones of the layers 602 about the cavities 604 may be offset horizontally from each other to provide a rough surface to improve bonding with the filler material. As another example, the void may have a roughly circular cross-sectional shape (when viewed from along the z-axis, i.e., from the top), with the circle in each layer offset relative to adjacent layers with some regular or irregular vertical pattern such as a vertical V, a sine wave, or any other arrangement that shifts in the x-y plane from layer to layer, or after some number of layers (i.e., vertically aligned for some number of layers, and then shifting for some number of layers, and so forth). More generally a cavity 604 may move and change shape or size as it passes from layer to layer vertically through an object.

Figure 7:
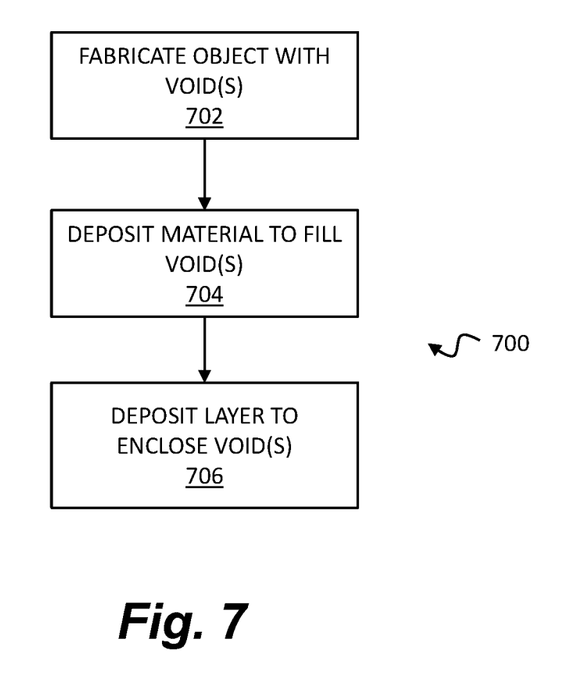
FIG. 7 shows a method for cavity filling.

FIG. 7 shows a method for cavity filling.

As shown in step 702, the method 700 may begin with fabricating a number of layers of an object with a three-dimensional printer. The object may be fabricated with a first material to provide an object having a number of layers that generally define an exterior surface of the object and an infill for the object within the exterior surface. The infill may further define one or more void spaces within an interior of the object. This may include space left in the interior by a regular (e.g., triangular, square, rectangular, hexagonal) or irregular (e.g., random space filling) geometry of vertical walls, such as conventionally used to provide structural integrity for a three-dimensional object, and to provide supporting structure for top surfaces where needed. In another aspect, the regular pattern of the infill may be further modified to provide additional cavities as contemplated herein. Thus a cavity may include void space within a preexisting infill pattern, or a cavity may be an additional volume created within the object. In either case, a bottom surface may be provided for the cavity in order to control a volume within the object that is filled with a void-filling material.

The first material may be any suitable build material, such as a build material selected from a group consisting of acrylonitride butadiene styrene (ABS), high-density polyethylene (HDPL), and polylactic acid (PLA), as well as blends of the foregoing and or other materials, as well as colorants or other additives used for their aesthetic and functional properties.

The void space of each cavity may take a variety of shapes, and have a variety of positions within an object. For example, the void space may include a prism extending through the number of layers, such as a rectangular prism, a triangular prism, a hexagonal prism, or a circular prism (i.e., a cylinder). Other shapes may also or instead be used for aesthetic affect, such as by using the shape of a brand or logo, or a fanciful shape such as a bunny or a teacup. The prism may extend perpendicular to the number of layers, that is, along the z-axis of a layered fabrication process. In another aspect, the prism may pass diagonally through the number of layers at an off angle from the z-axis.

More generally, each cavity may be formed by cross-sectional shapes that vary from layer to layer in either or both of position and shape. For example, the void space may be defined by a closed shape within each of the number of layers, where the closed shape in one of the number of layers has edges offset from at least one other closed shape in an adjacent one of the number of layers. The closed shape in each one of the number of layers may offset relative to an adjacent closed shape in an adjacent one of the number of layers using an offset that varies (within the x-y plane of the fabrication process) from layer to layer. The offsets may be arranged in a regular vertical pattern such as a sinusoid, a spiral, or a vertical V so that the center of the cross-section moves regularly from layer to layer (within the x-y plane and along the z-axis) according to the regular vertical pattern.

It will also be understood that any number of cavities may be used, and the void space may include a plurality of prisms or other shapes extending through the number of layers. Similarly, each such prism or other shape may start and stop at any suitable layer of the object, so that each one of the plurality of prisms has a top and a bottom each at a different layer height than another one of the plurality of prisms.

More generally, a variety of engineering and structural analysis techniques may be usefully employed to select and optimize the position, shape, size, and length of void spaces in the interior of a fabricated object. Without limiting the generality of the foregoing, the voids may be placed and filled to improve overall rigidity (e.g., by filling with a lightweight, rigid foam), to improve layer-to-layer adhesion (e.g., by placing voids across structural weak points and filling with build material), or to control the color or opacity of the resulting object. Similarly, liquids may be used to completely or partially fill voids as a novelty, or to control the weight or dynamic balance of the resulting object.

As shown in step 704, the method may include depositing a second material within the void space defined by the infill within the exterior surface. As noted above, the infill may inherently define void space that can be filled with the second material, or the infill may define further void spaces within the interior that are shaped and sized for specific structural or aesthetic results.

The second material may be any of the build materials described above. The second material may also or instead be a structural filler or an aesthetic filler. For example, the second material may be a structural filler such as a foam, a resin, an adhesive, an epoxy, or a glue, or any suitable combination of these. The structural filler may be a curable adhesive or other curable substance. As another example, the second material may be an aesthetic filler such as a colored filler or an opaque filler used to control light transmitting properties of a fabricated object. The filler may also or instead be a liquid used to control light transmitting properties, dynamic balance, weight, or other properties of the fabricated object.

As shown in step 706, the method may include fabricating at least one additional layer above the number of layers to enclose the second material within the void space. This may be, for example, a top layer of the object that forms an exterior surface of the object after fabrication, or this may be an interior layer of the object used to enclose the void and contain the second material contained therein. In certain instances, such as where the second material serves some further purpose, it may be desired to leave the second material exposed on an exterior surface of the fabricated object, in which case the additional layer may be omitted and the object may be finished without enclosing a surface of the second material.

While the foregoing description emphasizes a technique for filling void space within a fabricated three-dimensional object, it will be appreciated that the same method may be used to fabricate a mold that is filled with a second material to form a fabricated object. Thus in one aspect, the first material, the "build material," may be used to fabricate a mold having an interior shape or void space in the form of an object to be fabricated. This cavity may then be filled with a second material, nominally the "fill material" discussed above, that serves as the actual build material by taking the shape of the interior mold and then curing or otherwise setting to form the fabricated object. In such embodiments, the nominal "exterior surface" described above is used to form an interior surface of a mold, and the second material fills this interior surface to take the shape of a fabricated object. Thus in one aspect, the "exterior surface" fabricated with a first material may be the interior surface of a mold, and the second material used to fill a void may be used to fill this interior surface to create the fabricated object.

It will be understood that this becomes a question of terminology. Using this mold forming technique, it may be similarly stated that the infill includes a void space formed as a mold, and that the second material is a build material, such as a curable or settable material that fills the void space to take the form of the mold, thereby providing a fabricated object that can be released from the mold after the second material has cured or set as appropriate. Regardless of the terms used, it should be clear that the techniques disclosed herein may be employed to provide a molding process that can be used to fabricate a three-dimensional object. This approach may be usefully employed for example to mold food items. For example, the second material may be a chocolate or similar confection heated to a liquid state and then poured into the mold formed by the first material to provide a molded chocolate treat.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on a controller of a three-dimensional printer, controls the three-dimensional printer to perform the steps of:
fabricating a number of layers of an object with the three-dimensional printer using a first material to print the number of layers including an exterior surface and an infill within the exterior surface, wherein the infill defines a void space;
depositing a second material within the void space; and
fabricating at least one additional layer above the number of layers to enclose the second material within the void space, wherein the void space is defined by a closed shape within at least two of the number of layers, where the closed shape in one of the number of layers has edges offset from at least one other closed shape in an adjacent one of the number of layers.

2. The computer program product of claim 1, wherein the first material and the second material are a single type of build material.

3. The computer program product of claim 1, wherein the at least one additional layer is fabricated from the first material.

4. The computer program product of claim 1, wherein the at least one additional layer is fabricated from the second material.

5. The computer program product of claim 1, wherein the void space forms a mold for a three-dimensional object and the second material includes a build material for the three-dimensional object.

6. The computer program product of claim 1, wherein the void space has a regular geometry.

7. The computer program product of claim 1, wherein the first material is an extruded thermoplastic material.

8. The computer program product of claim 1, wherein the second material is a structural filler.

9. The computer program product of claim 8, wherein the structural filler is one or more of a foam, a resin, an adhesive, an epoxy, a thermoplastic, and a glue.

10. The computer program product of claim 8, wherein the structural filler is a curable adhesive.

11. The computer program product of claim 1, wherein the second material is an aesthetic filler.

12. The computer program product of claim 11, wherein the aesthetic filler is one or more of a colored filler and an opaque filler.

13. The computer program product of claim 12, wherein the aesthetic filler is a liquid.

14. The computer program product of claim 1, wherein the void space extends through the number of layers.

15. The computer program product of claim 14, wherein the void space is shaped as a prism.

16. The computer program product of claim 15, wherein the prism is perpendicular to the number of layers.

17. The computer program product of claim 15, wherein the prism passes diagonally through the number of layers.

18. The computer program product of claim 1, wherein the infill defines a plurality of void spaces shaped as prisms extending through the number of layers, and wherein each one of the plurality of void spaces has a top and a bottom each at a different layer height than another one of the plurality of void spaces.

19. The computer program product of claim 1, wherein a number of offsets for a number of closed shapes in a number of layers are arranged in a regular vertical pattern.

20. A computer program product comprising computer-executable code embodied in a non-transitory computer-readable medium that, when executing on one or more computing devices performs the steps of:
generating first instructions executable by a three-dimensional printer to fabricate a portion of an object with a first material, the portion of the object including an exterior surface of the object and an infill within the exterior surface, wherein the infill defines a void space;
generating second instructions executable by the three-dimensional printer to deposit a second material within the void space; and
generating third instructions executable by the three-dimensional printer to fabricate an additional portion of the object that encloses the second material within the void space, wherein the void space is defined by a closed shape within at least two of a number of layers of the portion of the object, where the closed shape in one of the number of layers has edges offset from at least one other closed shape in an adjacent one of the number of layers.

21. The computer program product of claim 20, wherein the additional portion of the object is fabricated from one of the first material or the second material.

22. A method for controlling a three-dimensional printer comprising:
generating first instructions executable by the three-dimensional printer to fabricate a portion of an object with a first material, the portion of the object including an exterior surface of the object and an infill within the exterior surface, wherein the infill defines a void space;
generating second instructions executable by the three-dimensional printer to deposit a second material within the void space; and
generating third instructions executable by the three-dimensional printer to fabricate an additional portion of the object that encloses the second material within the void space, wherein the void space is defined by a closed shape within at least two of a number of layers of the portion of the object, where the closed shape in one of the number of layers has edges offset from at least one other closed shape in an adjacent one of the number of layers; and
executing the first instructions, the second instructions, and the third instructions on the three-dimensional printer to fabricate the portion of the object, to deposit the second material within the void space, and to fabricate the additional portion of the object.

23. A computer program product comprising computer executable code embodied in a non-transitory computer readable medium that, when executing on a controller of a three-dimensional printer, controls the three-dimensional printer to perform the steps of:
fabricating a number of layers of an object with the three-dimensional printer using a first material to print the number of layers including an exterior surface and an infill within the exterior surface, wherein the infill defines a void space;
depositing a second material within the void space; and
fabricating at least one additional layer above the number of layers to enclose the second material within the void space, wherein the infill defines a plurality of void spaces shaped as prisms extending through the number of layers, and wherein each one of the plurality of void spaces has a top and a bottom each at a different layer height than another one of the plurality of void spaces.

* * * * *